(12) United States Patent
Tamaki et al.

(10) Patent No.: US 10,505,179 B2
(45) Date of Patent: Dec. 10, 2019

(54) METHOD FOR PRODUCING POLYANIONIC POSITIVE ELECTRODE ACTIVE MATERIAL COMPOSITE PARTICLES, AND POLYANIONIC POSITIVE ELECTRODE ACTIVE MATERIAL PRECURSOR-GRAPHITE OXIDE COMPOSITE GRANULATED BODIES

(71) Applicant: TORAY INDUSTRIES, INC., Tokyo (JP)

(72) Inventors: Eiichiro Tamaki, Otsu (JP); Yasuo Kubota, Otsu (JP); Hiroaki Kawamura, Otsu (JP); Miyuki Matsushita, Otsu (JP)

(73) Assignee: Toray Industries, Inc. (JP)

( * ) Notice: Subject to any disclaimer, the term of this patent is extended or adjusted under 35 U.S.C. 154(b) by 107 days.

(21) Appl. No.: 14/892,748

(22) PCT Filed: May 19, 2014

(86) PCT No.: PCT/JP2014/063194
§ 371 (c)(1),
(2) Date: Nov. 20, 2015

(87) PCT Pub. No.: WO2014/188996
PCT Pub. Date: Nov. 27, 2014

(65) Prior Publication Data
US 2016/0164074 A1   Jun. 9, 2016

(30) Foreign Application Priority Data
May 23, 2013   (JP) .................... 2013-108543

(51) Int. Cl.
*H01M 4/36*   (2006.01)
*H01M 4/58*   (2010.01)
*H01M 4/62*   (2006.01)
*H01M 4/02*   (2006.01)

(52) U.S. Cl.
CPC ......... *H01M 4/364* (2013.01); *H01M 4/5825* (2013.01); *H01M 4/625* (2013.01); *H01M 2004/028* (2013.01)

(58) Field of Classification Search
CPC ...... H01M 4/364; H01M 4/625; H01M 4/362; H01M 4/5825; H01M 4/0471; H01M 2004/028
See application file for complete search history.

(56) References Cited

U.S. PATENT DOCUMENTS

| 8,470,477 B2 | 6/2013 | Miwa | |
|---|---|---|---|
| 2012/0015249 A1* | 1/2012 | Awano | C01B 25/37 429/221 |
| 2012/0058397 A1 | 3/2012 | Zhamu et al. | |
| 2012/0088156 A1 | 4/2012 | Nomoto | |
| 2012/0315550 A1 | 12/2012 | Liu | |
| 2013/0157135 A1 | 6/2013 | Zhou et al. | |
| 2013/0177784 A1* | 7/2013 | Zhou | C01B 25/375 429/50 |
| 2013/0252499 A1* | 9/2013 | Zhou | D04H 1/00 442/327 |
| 2015/0102267 A1* | 4/2015 | Hu | H01M 4/04 252/506 |
| 2015/0333319 A1 | 11/2015 | Kawamura et al. | |

FOREIGN PATENT DOCUMENTS

| CN | 101209819 | * | 7/2008 | ............ C01B 25/45 |
|---|---|---|---|---|
| CN | 101651205 | A | 2/2010 | |
| CN | 102208626 | A | 10/2011 | |
| CN | 102386410 | A | 3/2012 | |
| CN | 102683697 | A | 9/2012 | |
| CN | 104937756 | * | 9/2015 | ........ H01M 10/0525 |
| CN | 104937756 | A | 9/2015 | |
| JP | 4043852 | | 2/2008 | |
| JP | 2012099467 | | 5/2012 | |

(Continued)

OTHER PUBLICATIONS

Hummers et al. (Journal Am. Chem. Soc. vol. 80 No. 6, p. 1339 Mar. 20, 1958).*
Mu et al. (Chin. Physics Letters vol. 30 No. 9, pp. 096101-1 to 096101-3).*
Zhang et al. Aldrich dot com Mat Sci vol. 9 No. 4; 4th qtr Sep. 2014 pp. 121-127.*
Supplementary European Search Report for Application No. EP 14801413, dated Mar. 8, 2017, 13 pages.
Chinese Office Action with English language translation for Application No. 2014800293053, dated Dec. 22, 2016, 11 pages.

(Continued)

*Primary Examiner* — Jonathan G Leong
*Assistant Examiner* — Aaron J Greso
(74) *Attorney, Agent, or Firm* — RatnerPrestia

(57) ABSTRACT

A method is provided for producing polyanionic positive electrode active material composite particles, which comprises: a step 1 wherein precursor composite granulated bodies, each of which contains a polyanionic positive electrode active material precursor particle in graphite oxide, are formed by mixing a polyanionic positive electrode active material precursor and graphite oxide; and a step 2 wherein the precursor composite granulated bodies obtained in step 1 are heated at 500° C. or higher in an inert atmosphere or in a reducing atmosphere. The maximum intensity of the X-ray diffraction peak based on the positive electrode active material is less than 50% of the maximum intensity of the X-ray diffraction peak based on the materials other than the positive electrode active material. The maximum intensity of the X-ray diffraction peak based on the positive electrode active material is 50% or more of the maximum intensity of the X-ray diffraction peak based on the materials other than the positive electrode active material.

5 Claims, No Drawings

(56) References Cited

FOREIGN PATENT DOCUMENTS

| JP | 2012209032 | | 10/2012 | | |
|---|---|---|---|---|---|
| JP | 2013065551 | | 4/2013 | | |
| WO | 2011069348 | | 6/2011 | | |
| WO | 2012031401 | | 3/2012 | | |
| WO | 2012040920 | | 4/2012 | | |
| WO | WO 2012/040920 | * | 4/2012 | ............. | C01B 25/45 |
| WO | WO 2012088697 | * | 7/2012 | ............... | B82B 3/00 |

OTHER PUBLICATIONS

International Search Report for International Application No. PCT/JP2014/063194 dated Jul. 29, 2014.

Qin, Z., et al., "Morphology controlled synthesis and modification of high-performance LiMnPO4 cathode materials for Li-ion batteries," 2012, pp. 21144-21153, vol. 22, Journal of Materials Chemistry.

Rui, X., et al., "Li3V2(PO4)3 nanocrystals embedded in a nanoporous carbon matrix supported on reduced graphene oxide sheets: Binder-free and high rate cathode material for lithium-ion batteries," May 5, 2012, pp. 171-177, vol. 214, Journal of Power Sources.

Wang, H., et al., "LiMn1—xFexPO4 nanorods grown on graphene sheets for ultrahigh-rate-performance lithium ion-batteries," 2011, pp. 7364-7368, vol. 50, Angewandte Chemie International Edition.

* cited by examiner

METHOD FOR PRODUCING POLYANIONIC POSITIVE ELECTRODE ACTIVE MATERIAL COMPOSITE PARTICLES, AND POLYANIONIC POSITIVE ELECTRODE ACTIVE MATERIAL PRECURSOR-GRAPHITE OXIDE COMPOSITE GRANULATED BODIES

CROSS REFERENCE TO RELATED APPLICATIONS

This is the U.S. National Phase application of PCT/JP2014/063194, filed May 19, 2014, which claims priority to Japanese Patent Application No. 2013-108543, filed May 23, 2013, the disclosure of each of these applications being incorporated herein by reference in their entireties for all purposes.

FIELD OF THE INVENTION

The present invention relates to a method for producing polyanionic positive electrode active material composite particles which are suitably used as a positive electrode material of a lithium ion secondary battery, and polyanionic positive electrode active material precursor-graphite oxide composite granulated bodies.

BACKGROUND OF THE INVENTION

A lithium ion secondary battery has been widely used for mobile electronic equipment such as mobile phones and laptop personal computers since it is a battery capable of attaining higher voltage and higher energy density and enables the battery to become smaller in size and lighter in weight compared to the conventional nickel-cadmium battery and nickel metal hydride battery. The lithium ion secondary battery is thought to further increase, in the future, in the opportunity of being utilized for onboard use in which the battery is incorporated into electric vehicles, hybrid electric vehicles and the like or industrial use such as electric power tools, and attaining further highly enhanced capacity and highly enhanced output has been eagerly desired.

The lithium ion secondary battery is composed of positive and negative electrodes having at least an active material capable of reversibly inserting/extracting lithium ions and a separator which is arranged in a container and separates the positive electrode from the negative electrode, the container being filled with a non-aqueous electrolytic solution.

The positive electrode is prepared by applying an electrode agent containing a positive electrode active material for a lithium battery, a conductive additive and a binding agent onto a metal foil current collector made of aluminum and the like and subjecting it to pressure forming. As the current positive electrode active material, a powder of composite oxides of lithium and a transition metal such as lithium cobaltate ($LiCoO_2$), lithium nickelate ($LiNiO_2$), or a ternary system material in which a portion of cobalt is substituted with nickel and manganese ($LiMn_xNi_yCo_{1-x-y}O_2$), and spinel type lithium manganate ($LiMn_2O_4$) has been used relatively frequently. In addition to these, metal oxides such as $V_2O_5$, metallic compounds such as $TiS_2$, $MoS_2$ and $NbSe_2$, and the like have also been utilized.

In recent years, polyanionic active materials having high capacity have been attracting attention. The most advanced material in terms of development among the polyanionic active materials is olivine-based (phosphate-based) active materials with a high level of safety. Among the olivine-based active materials, lithium iron phosphate ($LiFePO_4$) containing iron which is one of the abundant resources and is an inexpensive material has begun to be put into practical use. Moreover, lithium manganese phosphate ($LiMnPO_4$) with a high level of output energy has also been attracting attention as a next-generation active material. As other polyanionic active material, silicate type active materials, and fluorinated olivine-based active materials among the olivine-based active materials have been attracting attention. The silicate type active material is characterized in that its discharge capacity per weight is higher than that of the olivine-based active material. The fluorinated olivine-based active material is characterized in that its voltage is higher than that of the olivine-based active material. These active materials are expected as a next-generation active material.

The negative electrode is prepared, as with the positive electrode, by applying an electrode agent containing an active material, a conductive additive and a binder agent onto a metal foil current collector made of copper or the like and subjecting it to pressure forming, and in general, as the active material for the negative electrode, lithium metal, lithium alloys such as a Li—Al alloy and Li—Sn, silicon compounds in which SiO, SiC, SiOC and the like are the basic constituent elements, conductive polymers prepared by doping lithium into polyacetylene, polypyrrole and the like, intercalation compounds prepared by allowing lithium ions to be incorporated into crystals, carbon materials such as natural graphite, artificial graphite and hard carbon, and the like have been used.

In the active materials currently put into practical use, a theoretical capacity of the positive electrode is far lower than that of the negative electrode, and hence it is indispensable to improve a capacity density of the positive electrode for increasing a capacity of the lithium ion battery. Thus, the practical realization of the polyanionic active material being a next-generation active material having a high capacity is desired. However, the polyanionic positive electrode active material is very difficult to be put into practical use since it is very low in electron conductivity. Thus, a technology of imparting electrical conductivity to the polyanionic positive electrode active material is desired.

In order to improve the electron conductivity in the positive electrode, a technique of adding a conductive additive to the electrode agent is employed. Examples of materials heretofore used as the conductive additive include graphite, acetylene black, Ketjen Black and the like. However, particularly, in the positive electrode active material having low electrical conductivity, it is insufficient only to add the conductive additive, and it requires a technique of directly forming a composite of an active material/conductive carbon material serving as a conductive additive.

Patent Document 1 discloses a technique in which a raw material solution of an olivine-based positive electrode active material and a polymer serving as a carbon source are mixed and the resulting mixture is subjected to spray drying and baking to prepare a composite. NON-PATENT DOCUMENT 1 discloses a technique in which lithium manganese phosphate is mixed in an aqueous solution of graphite oxide and the resulting mixture is heated to dry.

Patent Document 2 and NON-PATENT DOCUMENT 2 disclose a technique of heating/drying an aqueous solution in which a raw material of an olivine-based positive electrode active material and graphite oxide are dissolved.

Patent Document 3 discloses a technique in which a raw material of an active material is heated and baked, and mixed with graphite oxide, and the resulting mixture is reduced.

Non-Patent Document 3 discloses a technique in which a positive electrode active material is synthesized in the presence of a graphite oxide, and then reduced.

PATENT DOCUMENTS

Patent Document 1: JP Patent No. 4043852
Patent Document 2: Japanese Patent Laid-open Publication No. 2013-65551
Patent Document 3: Japanese Patent Laid-open Publication No. 2012-99467

NON-PATENT DOCUMENTS

NON-PATENT DOCUMENT 1: Qin Z., et al. Journal of Materials Chemistry, 2011, 22, 21144
NON-PATENT DOCUMENT 2: Rui X., et al. Journal of Power Sources, 2012, 214, 171
NON-PATENT DOCUMENT 3: Wang H., et al. Angewandte Chemie International Edition, 2011, 50, 7364

SUMMARY OF THE INVENTION

In order to realize highly enhanced capacity and highly enhanced output of the positive electrode of the lithium ion conductivity, a positive electrode active material having high electron conductivity is required.

In Patent Document 1, an olivine-based positive electrode active material is coated with carbon by mixing the active material with sucrose and heating the resulting mixture in an inert atmosphere at 700° C.; however, in this technique, since a raw material of the conductive carbon is sucrose, the conductive carbon becomes amorphous carbon after heating and therefore the electrical conductivity of the conductive carbon is low, and high battery performance cannot be achieved. Further, in order to convert a raw material of the conductive carbon like sucrose to the conductive carbon, iron is essential, and therefore it is difficult to apply this technique to the active material other than lithium iron phosphate.

Further, in Non-Patent Document 1, lithium manganese phosphate particles are mixed in an aqueous graphite oxide solution, and then heated and dried to synthesize a composite, but in this method, the affinity of the surface of the lithium manganese phosphate particle for the graphite oxide is low since a composite of graphite oxide is formed after the lithium manganese phosphate particles are previously. Therefore, a compact composite cannot be formed and adequate electron conductivity is not achieved in the composite.

Patent Document 2 and NON-PATENT DOCUMENT 2 disclose a technique of heating/drying an aqueous solution in which an active material precursor being a raw material of an olivine-based positive electrode active material and graphite oxide are dissolved. In this method, since the active material precursor and the graphite oxide are merely mixed, a composite of the graphite oxide and the active material precursor cannot be formed in a state in which a contact area between them is large and adequate electron conductivity in the composite is not achieved.

Patent Document 3 discloses a technique in which a raw material mixture of lithium iron phosphate is heated and baked at a temperature of 250° C. to 450° C., a baked product of the raw material of lithium iron phosphate and graphite oxide are mixed, and then the graphite oxide is reduced. In this technique, since the baked product of the raw material of lithium iron phosphate is converted to lithium iron phosphate at the time of being heated and baked, the affinity for the graphite oxide is deteriorated and therefore a compact composite cannot be formed.

In NON-PATENT DOCUMENT 3, after lithium manganese phosphate particles are synthesized in the presence of graphite oxide, the graphite oxide is reduced to obtain a composite; however, in this technique, a compact composite cannot be formed as with in the case of mixing the active material and the graphite oxide in a solution.

It is an object of the present invention to provide a composite of an active material and a conductive carbon material, that is, active material composite particles, which has a large contact area between the polyanionic positive electrode active material and graphene and therefore has high electrical conductivity; and to provide a lithium ion battery with high capacity and high power utilizing the active material composite particles.

That is, one aspect of the present invention provides a method for producing polyanionic positive electrode active material composite particles, comprising:

a step 1 wherein precursor composite granulated bodies, each of which contains a polyanionic positive electrode active material precursor particle in graphite oxide, are formed by mixing a polyanionic positive electrode active material precursor and graphite oxide; and a step 2 wherein the precursor composite granulated bodies obtained in the step 1 are heated at 500° C. or higher in an inert atmosphere or in a reducing atmosphere;
wherein in the X-ray diffraction intensity of the precursor composite granulated bodies, the maximum intensity of the X-ray diffraction peak based on the positive electrode active material is less than 50% of the maximum intensity of the X-ray diffraction peak based on the materials other than the positive electrode active material, and in the X-ray diffraction intensity of the polyanionic positive electrode active material composite particles, the maximum intensity of the X-ray diffraction peak based on the positive electrode active material is 50% or more of the maximum intensity of the X-ray diffraction peak based on the materials other than the positive electrode active material, and a polyanionic positive electrode active material precursor-graphite oxide composite granulated bodies containing graphite oxide and polyanionic positive electrode active material precursor particles having a primary particle diameter of not less than 5 nm and not more than 100 nm.

In accordance with the present invention, it is possible to attain active material composite particles which have high electron conductivity and high ionic conductivity, and attain a lithium ion secondary battery having a high capacity and high power by using the composite particles as a positive electrode material.

DETAILED DESCRIPTION OF EMBODIMENTS OF THE INVENTION

[Polyanionic Positive Electrode Active Material Precursor]

Polyanionic positive electrode active materials in embodiments of the present invention are $Li_xM_yAO_z$ (M is a metallic element selected from the group consisting of manganese, iron, vanadium, nickel and cobalt, $0.5 \leq x \leq 2$, $0.5 \leq y \leq 2$, $3 \leq z \leq 4$, A is silicon or phosphorus or boron).

Examples of the polyanionic-based positive electrode active materials include olivine-based positive electrode active materials, silicate-based positive electrode active materials, borate-based positive electrode active materials, and lithium vanadium phosphate. Among the polyanionic positive electrode active materials, promising positive electrode active materials are olivine-based positive electrode active materials and silicate-based positive electrode active materials. An active material most suitable for the present invention is the olivine-based positive electrode active material.

The olivine-based positive electrode active materials refer to $Li_xM_yPO_4$ in which the above-mentioned A is phosphorus (M is a metallic element selected from the group consisting of manganese, iron, nickel and cobalt, $0.5 \leq x \leq 2$, $0.5 \leq y \leq 2$) The metallic element corresponding M is particularly preferably manganese and iron.

The olivine-based positive electrode active material may contain, in addition to metals corresponding Li and M, a metal whose elemental ratio is 10% or less with respect to phosphorus atoms. The metal contained in the olivine-based positive electrode active material is not limited, and examples thereof include manganese, iron, vanadium, nickel, cobalt, zinc, yttrium, magnesium, germanium and the like. The contained metal may be a fluorinated olivine-based positive electrode active material which is an olivine-based positive electrode active material containing fluorine.

The silicate-based positive electrode active materials refer to $Li_xM_ySiO_4$ (M is a metallic element selected from the group consisting of manganese, iron, vanadium, nickel and cobalt, $0.5 \leq x \leq 2$, $0.5 \leq y \leq 2$). The metallic element corresponding M is particularly preferably manganese and iron.

The silicate-based positive electrode active material may contain, in addition to metals corresponding Li and M, a metal whose elemental ratio is 10% or less with respect to phosphorus atoms. The metal contained in the silicate-based positive electrode active material is not limited, and examples thereof include manganese, iron, vanadium, nickel, cobalt, zinc, yttrium, magnesium, germanium and the like.

The borate-based positive electrode active materials refer to $Li_xM_yBO_3$ (M is a metallic element selected from among manganese and iron, $0.5 \leq x \leq 2$, $0.5 \leq y \leq 2$). The borate-based positive electrode active material may contain, in addition to metals corresponding Li and M, a metal whose elemental ratio is 10% or less with respect to phosphorus atoms. The metal contained in the borate-based positive electrode active material is not limited, and examples thereof include manganese, iron, vanadium, nickel, cobalt, zinc, yttrium, magnesium, germanium and the like.

The lithium vanadium phosphate refers to $Li_3V_2(PO_4)_3$. Although the lithium vanadium phosphate has a crystal system different from other active materials containing phosphate and is not an olivine-based active material, it is exemplified as a polyanionic positive electrode active material in the present invention.

The polyanionic positive electrode active material precursor in the present invention (hereinafter, sometimes referred to merely as "active material precursor") refers to a composition which becomes a polyanionic positive electrode active material by heating and baking it at 500° C. or higher. Specifically, the polyanionic positive electrode active material precursor in the present invention means a substance in which a diffraction peak characteristic of $Li_xM_yAO_z$ does not appear or only very minute peak appears in X-ray diffraction measurement before heating and baking, but a diffraction peak characteristic of $Li_xM_yAO_z$ appears as a main peal in X-ray diffraction measurement after heating and baking.

More specifically, with respect to the polyanionic positive electrode active material precursor-graphite oxide composite granulated bodies of the present invention (precursor composite granulated bodies), in the X-ray diffraction intensity of the precursor composite granulated bodies, the maximum intensity of the X-ray diffraction peak based on the positive electrode active material is preferably less than 50% of the maximum intensity of the X-ray diffraction peak based on the materials other than the positive electrode active material. Then, when the polyanionic positive electrode active material precursor of the present invention is heated and baked to be formed into the polyanionic positive electrode active material, with respect to a polyanionic positive electrode active material composite particles of the present invention, in the X-ray diffraction intensity of the polyanionic positive electrode active material composite particles, the maximum intensity of the X-ray diffraction peak based on the positive electrode active material is preferably 50% or more of the maximum intensity of the X-ray diffraction peak based on the materials other than the positive electrode active material. Conversely, a polyanionic positive electrode active material precursor in which the resulting polyanionic positive electrode active material composite particles becomes as described above is defined as the polyanionic positive electrode active material precursor in the present invention.

As the polyanionic positive electrode active material precursor, the olivine-based positive electrode active material precursor is composed of a lithium salt, a phosphoric salt, a required metallic salt, and a solvent as required. The olivine-based positive electrode active material precursor may further contain a substance serving as a fluorine source as required. As the polyanionic positive electrode active material precursor, the silicate-based positive electrode active material precursor is composed of a lithium salt, a silicate salt, a required metallic salt, and a solvent as required.

Examples of the lithium salt include lithium acetate, lithium hydroxide, lithium carbonate, and lithium acetylacetonate. Examples of the phosphoric salt include phosphoric acid and ammonium dihydrogen phosphate. Further, as a substance combining a phosphoric salt and a lithium salt, lithium dihydrogen phosphate or lithium phosphate may be used.

Examples of the silicate salt include alkoxy silicon such as tetraethoxy silicon, and $Li_2SiO_2$ and the like may be used as a substance combining a silicate salt and a lithium salt.

Examples of the borate salt include alkoxy boron such as triethoxy boron.

The metallic salt varies depending on the required metal, and for example, in the case of iron, examples of the metallic salt include iron chloride, iron sulfate, iron acetate, iron oxalate and the like. In the case of manganese, examples of the metallic salt include manganese acetate, manganese sulfate, manganese chloride, manganese oxalate and the like.

As the polyanionic positive electrode active material precursor, a composition in which the above-mentioned lithium salt, phosphoric salt or silicate salt or borate salt, and metallic salt corresponding M are mixed to such an extent that the distinctions cannot be made among them as raw materials of $Li_xM_yAO_z$, is preferably used. The state of being mixed to such an extent that the distinctions cannot be made among the lithium salt, the phosphoric salt and the metallic salt corresponding M refers to a state in which phosphoric acid and a kind of a metal corresponding M are present within a 10 μm radius of a lithium atom which is arbitrarily selected.

A preparation method of the active material precursor is not particularly limited. Examples of the preparation method include a method of mixing and dissolving the above-mentioned salts in a solvent such as water in the molar ratio between intended compounds and drying the resulting solution to remove the solvent, and a method of milling and mixing the salts.

A drying method in drying the formed solution is not particularly limited. In order to maintain a state of the active material precursor, it is preferred to perform drying at low temperatures. Specific examples of the method include a method of vacuum drying at low temperatures of 200° C. or lower, a method of spray drying, and a method of lyophilizing.

The solvent used in forming the solution is not particularly limited, and examples of the solvent include water, ethanol, methanol, isopropyl alcohol, N-methylpyrrolidone, dimethylfomamide and the like. For example when water is used, a lithium salt, a phosphoric salt, and a manganese salt as an example of a metal corresponding M are dissolved in water and adequately mixed with a stirrer or the like to prepare a precursor solution. A method in which the precursor solution adequately mixed is dried by spray drying to recover a powder, is exemplified.

There may be cases where a precipitation is produced at the time of mixing the salts depending on the conditions of pH, a solvent and the like, and this precipitate can also be utilized as a precursor. Specifically, a precipitate is produced by mixing lithium hydroxide, phosphoric acid and manganese sulfate in an aqueous solution so as to be 3:1:1 in the molar ratio. The precipitate can be collected by filtration and used as a precursor.

A technique of milling/mixing the precursor is not limited. For example, a blender, a crasher, a dry bead mill, a rocking mixer, Hybridizer, a planetary ball mill and the like can be employed. Among these, the planetary ball mill is preferably used. In the method of using the planetary ball mill, a lithium salt, a phosphoric salt, a manganese salt as an example of metal corresponding M, and zirconia beads were put in a zirconia container, the container is sealed, and the resulting mixture is mixed in the planetary ball mill, and thereby, a lithium manganese phosphate precursor in which the respective salts are adequately mixed, can be prepared. In order to accelerate mixing, a solvent such as water or alcohol may be added to the content of the zirconia container.

[Graphite Oxide]

The graphite oxide used in the present invention can be prepared by oxidizing graphite. When graphite is oxidized, an interlayer distance of the oxidized graphite becomes longer than that of graphite, and the graphite has a diffraction peak at a diffraction angle of 12.5° to 13.0° in X-ray diffraction measurement.

The graphite oxide can be prepared by a publicly known method. Moreover, commercially available graphite oxide may be purchased. A graphite serving as a raw material of the graphite oxide may be either an artificial graphite or a natural graphite; however, the natural graphite is preferably used. The number of meshes to which a particle size of the raw material graphite corresponds is preferably 20000 or less, and more preferably 5000 or less.

A preparation method of the graphite oxide is preferably a Hummers' method. An example of the Hummers' method will be mentioned below.

To a graphite powder, a concentrated sulfuric acid, sodium nitrate and potassium permanganate are added, and the resulting mixture is stirred and reacted under temperatures of 25° C. to 50° C. for 0.2 to 5 hours. Thereafter, a reactant is diluted by adding deionized water to obtain a suspension, and subsequently the suspension is reacted at a temperature of 80° C. to 100° C. for 5 to 50 minutes. Finally, hydrogen peroxide and deionized water are added, and the resulting mixture is reacted for 1 to 30 minutes, filtrated and washed to obtain a graphite oxide dispersion.

A ratio between reactants, for example, graphite powder, concentrated sulfuric acid, sodium nitrate, potassium permanganate and hydrogen peroxide water (30%), is 10 g:150 to 300 ml:2 to 8 g:10 to 40 g:40 to 80 g. When concentrated sulfuric acid, sodium nitrate and potassium permanganate are added, the temperature is controlled by means of an ice bath. When hydrogen peroxide water and deionized water are added, the mass of deionized water is 10 to 20 times larger than that of hydrogen peroxide water.

The oxidation degree of graphite oxide is not particularly limited. However, when the oxidation degree is too low, the affinity for the active material precursor can be deteriorated. Moreover, when the oxidation degree is too high, the electrical conductivity after being oxidized can be deteriorated. In the graphite oxide used in the present invention, the elemental ratio of an oxygen atom to a carbon atom in the graphite oxide is preferably not less than 0.3 and not more than 1. The ratio of oxygen atoms to carbon atoms in the graphite oxide can be measured by an X-ray photoelectron spectroscopy.

The oxidation degree of the graphite oxide can be adjusted by varying an amount of an oxidant to be used for the oxidation reaction of graphite. Specifically, the larger the amounts of sodium nitrate and potassium permanganate to be used in the oxidation reaction are with respect to the amount of graphite, the higher the oxidation degree of the graphite oxide becomes, and the smaller the amounts of sodium nitrate and potassium permanganate are, the lower the oxidation degree of the graphene oxide becomes. A weight ratio of sodium nitrate to graphite in the oxidation reaction is not particularly limited; however, it is preferably not less than 0.2 and not more than 0.8. A weight ratio of potassium permanganate to graphite is not particularly limited; however, it is preferably not less than 1 and not more than 4.

[Step 1: Step of Forming Polyanionic Positive Electrode Active Material Precursor-Graphite Oxide Composite Granulated Body]

The polyanionic positive electrode active material precursor-graphite oxide composite granulated bodies of the present invention (hereinafter, sometimes referred to merely as "precursor composite granulated bodies") can be obtained by forming a composite of primary particles of the polyanionic positive electrode active material precursor with the graphite oxide interposed. In the precursor composite granulated bodies, the polyanionic positive electrode active material precursor particles are contained in the graphite oxide and is preferably dispersed in the graphite oxide.

The precursor composite granulated bodies are obtained by a method of mixing the polyanionic positive electrode active material precursor with the graphite oxide.

As the graphite oxide, it is preferred to use a powdery graphite oxide. The graphite oxide powder is preferably prepared by a method such as spray-drying or lyophilization of a graphite oxide solution.

A technique of mixing the polyanionic positive electrode active material precursor and the graphite oxide is not particularly limited, and a publicly known mixer/kneader can be used as the technique. Specific examples thereof include a method of utilizing an automatic mortar, a three roll mill, a bead mill, a planetary ball mill, a homogenizer, a planetary mixer, a biaxial kneader or the like, and include a method of mixing them in a solid phase as a preferred form. By mixing them in a solid phase, a strong shear force is exerted between the graphite oxide and the positive electrode active material precursor to enable formation of a compact composite having a large contact area.

Particle diameters of the precursor composite granulated bodies can be fine in any of mixers and kneaders by milling the granulated bodies repeatedly. In order to achieve nanoscale milling, a kneader which comes into physical contact with particles to grind them is preferred, and a planetary ball mill, a dry bead mill and an automatic mortar are particularly preferred. When the active material precursor particles and the graphite oxide powder are not powdery but clumpy, if these materials are finely milled in advance by a blender, it becomes possible to form a composite with high uniformity.

An example in which a planetary ball mill is used will be described. Zirconia beads, a graphite oxide powder and active material precursor particles are put in a zirconia container. The ratio between the active material precursor particles and the graphite oxide in this time is preferably adjusted such that a weight ratio of carbon components in the composite granulated bodies is 1% to 10% after the composite undergoes the reduction and baking step. After the composite undergoes the reduction and baking step, about 50% of the graphite oxide remains as carbon components. Further, since the active material precursor loses components other than $Li_xM_yAO_z$, a remaining percentage varies depending on the type of a salt. The mixing ratio of the active material precursor particles and the graphite oxide is determined in consideration of such carbon remaining percentage of the graphite oxide and remaining percentage after baking the active material precursor. A solvent such as water or alcohol is added as required in mixing the active material precursor particles and the graphite oxide since mixing and milling may be accelerated by addition of such a solvent.

When a planetary ball mill is used, by adjusting a zirconia bead diameter, a capacity of a zirconia container, a rotational speed of a ball mill, and a pulverizing time, the primary particle diameter of the active material precursor particles in the resulting precursor composite granulated bodies can be adjusted. A proper condition cannot be uniformly determined since it varies depending on the oxidation degree of the graphite oxide or a type of the precursor composite granulated bodies, but for example, when a planetary ball mill manufactured by Fritsch Gmbh (type P-5) is used in the conditions of Example 1, the active material precursor composite granulated bodies of the present invention can be attained by mixing in conditions of a zirconia bead diameter of 3 mm to 10 mm, a zirconia container of 12 ml, a rotational speed of 250 to 300 rpm, a powder total amount of 1 to 2 g, and an entrainer amount of 0.05 g to 0.2 g.

If a contact area between the active material precursor and graphite oxide in the precursor composite granulated bodies is not adequately large, sufficient electrical conductivity cannot be achieved, and therefore the active material precursor particles are preferably adequately fine. Accordingly, the primary particle diameter of the polyanionic active material precursor particles in the precursor composite granulated bodies is preferably 100 nm or less, more preferably 50 nm or less, and moreover preferably 30 nm or less. On the other hand, when the active material precursor particles are too small, a crystallite size of the polyanionic positive electrode active material becomes too small after baking to increase the effect of a crystal interface, and a capacity as a positive electrode active material decreases. The primary particle diameter of the active material precursor particles is preferably 5 nm or more, more preferably 8 nm or more, and moreover preferably 10 nm or more.

Sometimes the polyanionic positive electrode active material is partially produced also in the precursor before baking. The polyanionic positive electrode active material precursor has higher affinity for graphene oxide than that of the polyanionic positive electrode active material itself. Therefore, if a large amount of the polyanionic positive electrode active material is produced at the time of the precursor, efficiency of composite formation tends to be lowered. Thus, a precursor composite requires that in the X-ray diffraction intensity, the maximum intensity of the X-ray diffraction peak based on the polyanionic positive electrode active material is less than 50% of the maximum intensity of the X-ray diffraction peak based on the materials other than the polyanionic positive electrode active material. The maximum intensity based on the positive electrode active material is preferably less than 30% of that based on the materials other than the positive electrode active material, and more preferably less than 10%.

For example, when the polyanionic positive electrode active material is lithium manganese phosphate, the maximum intensity of the X-ray diffraction peak of the lithium manganese phosphate is any one of a peak around 26.2°, a peak around 29.2°, and a peak around 36.10. Among these peaks, the peak having the maximum intensity needs to have an intensity less than 50% of that of a peak having the maximum intensity among peaks based on raw materials or composite salts other than lithium manganese phosphate.

A primary particle diameter of the active material precursor particles can be measured by a transmission electron microscope. A cross-section of the precursor composite granulated body is exposed by using an ion milling system, and the cross section is observed using a transmission electron microscope, and thereby, shapes of the active material precursor primary particles present in the precursor composite granulated bodies can be observed. In the present invention, when by this technique, the primary particle was observed at a field of view of 500000 times, an average particle diameter of all particles within the field of view is defined as an average particle diameter of the active material precursor primary particles.

When a ratio of graphene remaining after heating treatment is higher, electrical conductivity becomes higher but a battery capacity per weight is reduced. Therefore, the mass ratio of a carbon component contained in the precursor composite granulated bodies is preferably 10% or less, more preferably 8% or less, and moreover preferably 5% or less. Further, the mass ratio is preferably 1% or more, more preferably 2% or more, and moreover preferably 3% or more.

The mass ratio of the carbon component contained in the precursor composite granulated bodies can be quantified, for example, by a carbon-sulfur analyzer. In the carbon-sulfur analyzer, a composite is heated in the air by a highfrequency, carbon contained in the composite is completely oxidized, and generated carbon dioxide is detected by infrared rays. In analyzing the amount of carbon components, the precursor composite granulated bodies are heated at 600° C. for 6 hours in a nitrogen atmosphere before the analysis. After a solvent is removed by this processing to allow the active material precursor to adequately react, analysis of the carbon components is performed.

Example of a method other than the carbon-sulfur analyzer includes a method in which inorganic components of the composite are dissolved/removed with an acid or the like, and remaining organic components are measured by X-ray photoelectron spectroscopy. Specifically, a ratio between the inorganic components and organic components in the composite is measured by measuring a weight of the composite before and after dissolving/removing the inorganic components. Furthermore, an elemental ratio of remaining organic components is measured by X-ray photoelectron spectroscopy. By utilizing these two measurements in combination, the mass ratio of the carbon components can be measured.

When the particle size of the polyanionic positive electrode active material precursor-graphite oxide composite granulated bodies of the present invention is too small, the granulated bodies are easily aggregated in preparing an electrode paste, and therefore a problem that it becomes difficult to prepare an electrode coating can arise. By contraries, when the particle diameter is too large, it takes much time for an electrolytic solution to permeate inside of the composite granulated body and ionic conductivity can be deteriorated. Therefore, the particle diameter of the precursor composite granulated body is preferably 0.5 Cm or more, more preferably 1 µm or more, and particularly preferably 3 µm or more. The particle diameter is preferably 20 µm or less, more preferably 15 µm or less, and particularly preferably 10 µm or less. The particle diameter referred to herein refers to a median diameter at the time when the precursor composite granulated bodies are circulated in a dispersed state in water, dispersed by irradiating ultrasonic waves immediately before measurement, and measured by a particle size analyzer of laser diffraction scattering type.

[Step 2: Step of Heating Active Material Precursor-Graphite Oxide Composite Granulated Bodies]

Polyanionic positive electrode active material-graphene composite particles, namely, polyanionic positive electrode active material composite particles can be obtained by heating the polyanionic positive electrode active material precursor-graphite oxide composite granulated bodies obtained by the above-mentioned step at 500° C. or higher in an inert atmosphere or in a reducing atmosphere. The polyanionic positive electrode active material precursor in the precursor composite granulated bodies becomes a polyanionic positive electrode active material by heating it. Further, graphite oxide in the precursor composite granulated bodies is reduced by being heated in an inert atmosphere or in a reducing atmosphere to become graphene.

Further, the inert atmosphere referred to herein refers to an atmosphere of an inert gas such as nitrogen, argon or helium, or vacuum; however, a small amount of oxygen may be contained as long as the amount of oxygen is at a level at which carbon components do not burn. Also, the reducing atmosphere refers to an atmosphere filled with a reducing gas, and it may be a hydrogen atmosphere, or a state in which a reducing organic substance is volatilized, or an atmosphere in which a part of an inert gas is replaced with a reducing gas.

Although when a heating temperature is higher, the crystallinity of the polyanionic active material becomes high and battery performance tends to enhance, fine particles undergo sintering and particles of the active material become large when the heating temperature is too high, and therefore a preferred temperature range is present. The heating temperature is preferably 550° C. or higher, and more preferably 600° C. or lower. Further, the heating temperature is preferably 800° C. or lower, and more preferably 700° C. or lower.

A heating time is not particularly limited and include; however, it is preferred to heat for a long time in order to stably obtain a positive electrode active material and graphene. Specifically, the heating time is preferably 6 hours or more, and more preferably 12 hours or more.

The polyanionic positive electrode active material precursor becomes a polyanionic positive electrode active material by undergoing a heating step. It can be confirmed by measurement of X-ray diffraction that the polyanionic positive electrode active material is produced by heating the polyanionic positive electrode active material precursor. When remaining components of the precursor or impurities other than the polyanionic positive electrode active material remain after baking, an active material component per weight is reduced and battery performance of the composite particles is deteriorated, and therefore the amount of the remaining components of the precursor or the impurities is preferably small. The amount of remaining components of the precursor or impurities can be evaluated by measuring the maximum intensity of the X-ray diffraction peak based on the positive electrode active to the maximum intensity of the X-ray diffraction peak based on the materials other than the positive electrode active material in the X-ray diffraction intensity.

It is preferred that the maximum intensity of the X-ray diffraction peak based on the positive electrode active material is 50% or more of the maximum intensity of the X-ray diffraction peak based on the materials other than the positive electrode active material. The maximum intensity based on the positive electrode active material is more preferably 200% or more of that based on the materials other than the positive electrode active material, and moreover preferably 1000% or more. It is most preferred that remaining components of the precursor or impurities are not present after heating and it is most preferred that the X-ray diffraction peak based on the materials other than the positive electrode active material is not detected.

[Chemical Reduction Step]

In reduction of the graphite oxide, chemical reduction can attain graphene higher in electrical conductivity than that by heating reduction. Therefore, in the method for producing active material composite particles of the present invention, it is preferred to provide a chemical reduction step of chemically reducing the precursor composite granulated bodies prior to the above-mentioned heating step.

As the reducing agent used for chemical reduction, any of organic reducing agents and inorganic reducing agents can be used. Examples of the organic reducing agents include aldehyde-based reducing agents, hydrazine derivative reducing agents, and alcoholic reducing agents, and among organic reducing agents, alcoholic reducing agents are particularly suitable since they can be reduced relatively mildly. Examples of the alcoholic reducing agents include methanol, ethanol, propanol, isopropyl alcohol, butanol, benzyl alcohol, phenol, catechol, ethanolamine, dopamine, ethylene glycol, propylene glycol, diethylene glycol, and the like, and benzyl alcohol, catechol and dopamine are particularly suitable.

Examples of the inorganic reducing agent include sodium dithionite, potassium dithionite, phosphorous acid, sodium borohydride, hydrazine and the like, and among the inorganic reducing agents, hydrazine, sodium dithionite and potassium dithionite are suitably used since they can adequately reduce the graphite oxide even at ambient temperatures and can achieve high electrical conductivity.

A reductive condition is not limited; however, when an alcohol reducing agent is used, it is preferred to perform reduction at elevated temperatures, and for example, a technique in which the alcohol reducing agent is used as a solvent, the precursor composite is dispersed in a concentration of about 1 to 5% and refluxed while being heated around a boiling point of the alcohol reducing agent while being stirred, is preferably used.

In an organic reducing agent other than alcohol, for example, the reducing agent such as catechol and phenol, it is preferred that the precursor composite is dispersed in a concentration of about 1 to 5% in water, and an inorganic reducing agent is charged in a weight ratio of about 50 to 100% with respect to the precursor composite while being stirred with a stirrer. A preferred temperature at the time of reducing the precursor composite, varying depending on a type of the reducing agent, is 80 to 100° C. in the case of catechol, for example.

When the inorganic reducing agent is used, it is preferred that the precursor composite is dispersed in a concentration of about 1 to 5% in water, and an inorganic reducing agent is charged in a weight ratio of about 50 to 100% with respect to the precursor composite while being stirred with a stirrer. A preferred temperature in the reduction varies depending on a type of the reducing agent, and it is 40° C. to 60° C., for example, in the case of sodium dithionite.

EXAMPLES

Measurement Example 1: X-Ray Photoelectron Measurement

Measurement of X-ray photoelectron of each sample was carried out by using Quantera SXM (manufactured by Physical Electronics, Inc. (PHI)). An excited X-ray is monochromatic Al $K_{\alpha 1}$ and $K_{\alpha 2}$ lines (1486.6 eV), and a diameter of X-ray was set to 200 µm, and a photoelectron escape angle was set to 45°.

A ratio of oxygen atoms to carbon atoms in the graphite oxide was determined from a peak area of oxygen atoms and a peak area of carbon atoms respectively measured by wide scan.

Measurement Example 2: Elementary Analysis

In analyzing the amount of carbon components, the precursor composite granulated bodies are heated for 6 hours in a nitrogen gas at 600° C. before the analysis. After a solvent is removed by this processing to allow the precursor composite granulated bodies to adequately react, a mass ratio of carbon in the precursor composite granulated bodies was analyzed using a carbon-sulfur analyzer (EMIA-810W manufactured by HORIBA, Ltd.).

Measurement Example 3: Electrochemical Evaluation

A mixture of the prepared polyanionic positive electrode active material-graphene composite particles (700 mg), acetylene black (40 mg) as a conductive additive, polyvinylidene fluoride (60 mg) as a binder and N-methylpyrrolidone (800 mg) as a solvent was mixed with a planetary mixer to obtain an electrode paste. The electrode paste was applied onto an aluminum foil (thickness: 18 µm) by using a doctor blade (300 µm) and dried at 80° C. for 30 minutes to obtain an electrode plate.

The prepared electrode plate was cut out into a piece of 15.9 mm in diameter as a positive electrode, a lithium foil cut out into a size of 16.1 mm in diameter and 0.2 mm in thickness was used as a negative electrode, Celgard #2400 (manufactured by Celgard Inc.) cut out into a size of 17 mm in diameter was used as a separator, and a solvent composed of ethylene carbonate containing $LiPF_6$ with a concentration of 1M and diethylene carbonate in proportions of 7:3 was used as an electrolyte to prepare a 2042 type coin battery, and electrochemical evaluations were carried out.

In charging and discharging measurement, when the active material is $LiMnPO_4$, an upper limit voltage was set to 4.4 V and a lower limit voltage was set to 2.7 V, and when the active material is $LiFePO_4$, an upper limit voltage was set to 4.0 V and a lower limit voltage was set to 2.5 V, and charge-discharge was performed at a rate of 0.1 C three times, and subsequently charge-discharge was performed at a rate of 3 C three times, and the capacity at the time of third discharge at each rate was taken as a discharge capacity.

When the active material is $Li_2MnSiO_4$, an upper limit voltage was set to 4.5 V and a lower limit voltage was set to 2.7 V, and charge-discharge was performed at a rate of 0.1 C three times, and subsequently charge-discharge was performed at a rate of 0.3 C three times, and the capacity at the time of third discharge at each rate was taken as a discharge capacity.

Measurement Example 4: X-Ray Diffraction Measurement

Measurement of X-ray diffraction of the precursor composite granulated bodies and the polyanionic positive electrode active material composite particles was carried out by use of D8 Advance (manufactured by Bruker Corporation). A powder of the precursor composite granulated bodies or the positive electrode active material composite particles was spread over a glass sample stage with a cavity, and measurement of X-ray diffraction was carried out with the stage fixed. A measuring angle was set to 5° to 70° and a scan speed was set to 6°/min. The maximum strength of a peak in the present invention was determined from a height of the peak obtained from the results of measurement.

X-ray diffraction measurement of precursor composite granulated bodies: A value of (Maximum intensity of X-ray diffraction peak based on positive electrode active material)/ (Maximum intensity of X-ray diffraction peak based on materials other than positive electrode active material)×100 (%) was determined based on the X-ray diffraction intensity of the precursor composite granulated bodies.

X-ray diffraction measurement of polyanionic positive electrode active material composite particles: A value of (Maximum intensity of X-ray diffraction peak based on positive electrode active material)/(Maximum intensity of X-ray diffraction peak based on materials other than positive electrode active material)×100(%) was determined based on the X-ray diffraction intensity of the polyanionic positive electrode active material composite particles. When the X-ray diffraction peak based on materials other than the positive electrode active material is not detected, it is decided that the maximum intensity of X-ray diffraction peak based on the positive electrode active material is 50% or more of the maximum intensity of X-ray diffraction peak based on materials other than positive electrode active material.

Synthesis Example 1: Preparation 1 of Graphite Oxide

A natural graphite powder (produced by Shanghai Yifan Graphite Co., Ltd.) whose particle size corresponds to 2000 mesh was used as a raw material. To 10 g of the natural graphite powder in an ice bath were added 220 ml of a 98% concentrated sulfuric acid, 3.5 g of sodium nitrate and 21 g of potassium permanganate, and the resulting mixture was mechanically stirred for 1 hour while maintaining a temperature of a mixed liquid at 20° C. or lower. The mixed liquid was taken out from the ice bath, and stirred for 4 hours in a water bath at 35° C. to be reacted, and thereafter a suspension obtained by adding 500 ml of ion-exchange water was further reacted at 90° C. for 15 minutes. Finally, 600 ml of ion-exchange water and 50 ml of hydrogen peroxide water (concentration 70%) were added, and the resulting mixture was reacted for 5 minutes to obtain a graphite oxide dispersion. The dispersion was filtered, metal ions were washed with a dilute hydrochloric acid solution, and an acid was washed repeatedly with ion-exchange water until a pH of water became 7 to prepare a graphite oxide gel. The graphite oxide gel was lyophilized to obtain a graphite oxide powder. The elemental ratio of an oxygen atom to a carbon atom of the obtained graphite oxide powder was measured according to Measurement Example 1, and consequently the elemental ratio was 0.45.

Synthesis Example 2: Preparation 2 of Graphite Oxide

A graphite oxide gel was prepared in the same manner as in Synthesis Example 1 except for changing the amounts of sodium nitrate and potassium permanganate to 2.75 g and 16.5 g, respectively. The elemental ratio of an oxygen atom to a carbon atom of the obtained graphite oxide powder was measured according to Measurement Example 1, and consequently the elemental ratio was 0.41.

Example 1

As a raw material of a positive electrode active material, an aqueous solution was prepared in which a molar ratio of lithium hydroxide (LiOH), manganous sulfate ($MnSO_4$) and phosphoric acid ($H_3PO_4$) was 1:1:1 and the solution concentration was 0.1 mol/Kg. The aqueous solution was spray-dried to prepare an active material precursor gel of lithium manganese phosphate ($LiMnPO_4$) serving as a positive electrode active material.

[Step 1]
The lithium manganese phosphate precursor gel (1 g), the graphite oxide (GO) powder prepared in Synthesis Example 1 (0.05 g), water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a lithium manganese phosphate precursor-graphite oxide composite granulated bodies. A cross-section of the precursor composite granulated body was exposed by an ion milling system, and the cross section was observed using a transmission electron microscope, and consequently an average primary particle diameter of the active material precursor was 36 nm. Further, the mass ratio of carbon in the graphite oxide precursor composite granulated bodies was analyzed according to Measurement Example 2, and consequently it was 0.033. The lithium manganese phosphate precursor-graphite oxide composite granulated bodies were measured according to Measurement Example 3, and consequently the maximum intensity of X-ray diffraction peak based on lithium manganese phosphate was 5% of the maximum intensity of X-ray diffraction peak based on materials other than lithium manganese phosphate.

[Chemical Reduction Step]
The graphite oxide-lithium manganese phosphate precursor composite granulated bodies (1 g) were dispersed in water (100 g) and dithionous acid (1 g) was added, and the resulting mixture was reacted at 40° C. for 1 hour to reduce the graphite oxide. The reduced composite granulated bodies were filtered and washed.

[Step 2]
The composite granulated bodies were heated at 600° C. for 12 hours in a nitrogen atmosphere to obtain a lithium manganese phosphate-graphene composite. The lithium manganese phosphate-graphene composite particles were measured according to Measurement Example 3, and consequently the X-ray diffraction peak based on lithium manganese phosphate was detected, but the X-ray diffraction peak based on materials other than lithium manganese phosphate was not detected. A discharge capacity was measured according to Measurement Example 4, and consequently it was 152 mAh/g at a rate of 0.1 C and 141 mAh/g at a rate of 3 C. Production conditions and experiment results are shown in Table 1 and Table 2.

Example 2 to Example 7

Positive electrode active material composites were produced and each experiment was performed in the same manner as in Example 1 except for changing the raw materials of positive electrode active materials to be used, graphite oxide (carbon) to be used, mixing amounts/mixing ratios, and performed chemical reduction step/not performed as described in Table 1 and Table 2. Production conditions and experiment results are shown in Table 1 and Table 2.

Example 8

As a raw material of a positive electrode active material, lithium acetate ($CH_3COOLi$), manganous acetate (($CH_3COO$)$_2$Mn) and tetraethoxysilane ($Si(OC_2H_5)_4$) were dissolved in a molar ratio of 2:1:1 in ethanol, and the resulting solution was refluxed at 80° C. in an argon atmosphere to obtain a precursor of $Li_2MnSiO_4$.

[Step 1]
The $Li_2MnSiO_4$ precursor (1 g), the graphite oxide (GO) powder prepared in Synthesis Example 1 (0.05 g), water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a $Li_2MnSiO_4$ precursor-graphite oxide composite granulated bodies. A cross-section of the precursor composite granulated body was exposed by an ion milling system, and the cross section was observed using a transmission electron microscope, and consequently an average primary particle diameter of the active material precursor was 45 nm. Further, the mass ratio of carbon in the graphite oxide precursor composite granulated bodies was analyzed according to Measurement Example 2, and consequently it was 0.035. The $Li_2MnSiO_4$ precursor-graphite oxide composite granulated bodies were measured according to Measurement Example 3, and consequently the peak based on $Li_2MnSiO_4$ was not detected.

[Chemical Reduction Step]

The graphite oxide precursor composite granulated bodies (1 g) were dispersed in water (100 g) and dithionous acid (1 g) was added, and the resulting mixture was reacted at 40° C. for 1 hour to reduce the graphite oxide. The reduced composite granulated bodies were filtered and washed.

[Step 2]

The composite granulated bodies were heated at 600° C. for 12 hours in a nitrogen atmosphere to obtain a $Li_2MnSiO_4$-graphene composite. The $Li_2MnSiO_4$-graphene composite particles were measured according to Measurement Example 3, and consequently the X-ray diffraction peak based on $Li_2MnSiO_4$ was detected, but the X-ray diffraction peak based on materials other than $Li_2MnSiO_4$ was not detected. A discharge capacity was measured according to Measurement Example 4, and consequently it was 180 mAh/g at a rate of 0.1 C and 132 mAh/g at a rate of 0.3 C. Production conditions and experiment results are shown in Table 1 and Table 2.

Comparative Example 1

A lithium manganese phosphate precursor was prepared in the same manner as in Example 1, and a composite of the precursor and graphene (produced by (XG Sciences, Inc., XGNP-M-5) used in place of the graphite oxide powder was formed to obtain lithium manganese phosphate precursor-graphene composite granulated bodies. The lithium manganese phosphate precursor-graphite oxide composite granulated bodies were measured according to Measurement Example 3, and consequently the maximum intensity of X-ray diffraction peak based on lithium manganese phosphate was 5% of the maximum intensity of X-ray diffraction peak based on materials other than lithium manganese phosphate.

The precursor-graphene composite granulated bodies were heated at 600° C. for 12 hours in a nitrogen atmosphere to obtain a lithium manganese phosphate-graphene composite. Production conditions and experiment results are shown in Table 1 and Table 2. The lithium manganese phosphate-graphene composite particles were measured according to Measurement Example 3, and consequently the X-ray diffraction peak based on lithium manganese phosphate was detected, but the X-ray diffraction peak based on materials other than lithium manganese phosphate was not detected.

Comparative Example 2

An aqueous solution was prepared in which a molar ratio of lithium hydroxide as a lithium salt, $FeCl_2$ as an iron salt and phosphoric acid as a phosphoric salt was 1:1:1 and the solution concentration was 100 mm. In 2 kg of the aqueous solution, 5.7 g of sucrose was dissolved, and the resulting solution was spray-dried to obtain precursor composite granulated bodies. The lithium iron phosphate precursor-graphite oxide composite granulated bodies were measured according to Measurement Example 3, and consequently the maximum intensity of X-ray diffraction peak based on lithium iron phosphate was 16% of the maximum intensity of X-ray diffraction peak based on materials other than lithium iron phosphate.

The precursor composite granulated dies were heated at 700° C. for 24 hours in a nitrogen atmosphere to obtain a lithium iron phosphate-graphene composite. Production conditions and experiment results are shown in Table 1 and Table 2. The lithium iron phosphate-graphene composite particles were measured according to Measurement Example 3, and consequently the X-ray diffraction peak based on lithium manganese phosphate was detected, but the X-ray diffraction peak based on materials other than lithium manganese phosphate was not detected.

Comparative Example 3

An aqueous solution was prepared in which a molar ratio of lithium hydroxide as a lithium salt, $FeCl_2$ as an iron salt and ammonium dihydrogen phosphate as a phosphoric salt was 1:1:1 and the solution concentration was 6 mm. The aqueous solution (200 ml) and an aqueous solution (300 ml) containing graphite oxide (730 mg) dissolved therein were mixed. The mixed solution was dried while being stirred at 300 rpm with a stirrer until it becomes a gel at 60° C., and then the solution was vacuum dried at 120° C. for 12 hours to obtain precursor composite granulated bodies. The lithium iron phosphate precursor-graphite oxide composite granulated bodies were measured according to Measurement Example 3, and consequently the maximum intensity of X-ray diffraction peak based on lithium iron phosphate was 13% of the maximum intensity of X-ray diffraction peak based on materials other than lithium iron phosphate.

The precursor composite granulated bodies were heated at 600° C. for 24 hours in a nitrogen atmosphere to obtain a lithium iron phosphate-graphene composite. Production conditions and experiment results are shown in Table 1 and Table 2. The lithium iron phosphate-graphene composite particles were measured according to Measurement Example 3, and consequently the X-ray diffraction peak based on lithium iron phosphate was detected, but the X-ray diffraction peak based on materials other than lithium iron phosphate was not detected.

Comparative Example 4

Lithium carbonate as a lithium salt, $FeC_2O_4$ as an iron salt and ammonium dihydrogen phosphate as a phosphoric salt were mixed by a ball mill in acetone. The resulting mixture was formed by compressing in the form of pellet and baked at 450° C. for 24 hours to obtain a precursor.

[Step 1]

After the lithium iron phosphate precursor (1 g) was ground with a mortar, the graphite oxide (GO) powder prepared in Synthesis Example 1 (0.05 g) and acetone (1 g) were added to the precursor, and resulting mixture and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a lithium iron phosphate precursor-graphite oxide composite granulated bodies. A cross-section of the precursor composite granulated body was exposed by an ion milling system, and the cross section was observed using a transmission electron microscope, and consequently an average primary particle diameter of the active material precursor was 80 nm. Further, the mass ratio of carbon in the graphite oxide precursor composite granulated bodies was analyzed according to Measurement Example 2, and consequently it was 0.036. The lithium iron phosphate precursor-graphite oxide composite granulated bodies were measured according to Measurement Example 3, and consequently the maximum intensity of X-ray diffraction peak based on lithium iron phosphate was 220% of the maximum intensity of X-ray diffraction peak based on materials other than lithium iron phosphate.

[Step 2]

The precursor composite granulated bodies were heated at 650° C. for 24 hours in a nitrogen atmosphere to obtain lithium iron phosphate-graphene composite. The lithium iron phosphate-graphene composite particles were measured according to Measurement Example 3, and consequently the X-ray diffraction peak based on lithium iron phosphate was detected, but the X-ray diffraction peak based on materials other than lithium iron phosphate was not detected. A discharge capacity was measured according to Measurement Example 4, and consequently it was 103 mAh/g at a rate of 0.1 C and 32 mAh/g at a rate of 0.3 C. Production conditions and experiment results are shown in Table 1 and Table 2.

TABLE 1

| | Positive Electrode Active Material Raw Material | | | Positive Electrode | | | Mass Ratio of Carbon |
|---|---|---|---|---|---|---|---|
| | Li | M | $PO_4$ or $SiO_4$ | Active Material | Carbon | Mixed Amount•Mixing Ratio | Components (% by mass) |
| Example 1 | LiOH | $MnSO_4$ | $H_3PO_4$ | $LiMnPO_4$ | Synthesis Example 1 | precursor gel:graphene oxide (GO) = 1 g:0.05 g | 3.3 |
| Example 2 | LiOH | $FeSO_4$ | $H_3PO_4$ | $LiFePO_4$ | Synthesis Example 1 | precursor gel:GO = 1 g:0.05 g | 3.1 |
| Example 3 | LiOH | $MnCl_2$ | $NH_4H_2PO_4$ | $LiMnPO_4$ | Synthesis Example 1 | precursor gel:GO = 1 g:0.05 g | 4.1 |
| Example 4 | LiOH | $FeC_2O_4$ | $NH_4H_2PO_4$ | $LiFePO_4$ | Synthesis Example 1 | precursor gel:GO = 1 g:0.05 g | 4.3 |
| Example 5 | LiOH | $MnSO_4$ | $H_3PO_4$ | $LiMnPO_4$ | Synthesis Example 2 | precursor gel:GO = 1 g:0.05 g | 3.2 |
| Example 6 | LiOH | $MnSO_4$ | $H_3PO_4$ | $LiMnPO_4$ | Synthesis Example 1 | precursor gel:GO = 1 g:0.025 g | 1.5 |
| Example 7 | LiOH | $MnSO_4$ | $H_3PO_4$ | $LiMnPO_4$ | Synthesis Example 1 | precursor gel:GO = 1 g:0.05 g | 3.3 |
| Example 8 | $CH_3COOLi$ | $(CH_3COO)_2Mn$ | $Si(OC_2H_5)_4$ | $Li_2MnSiO_4$ | Synthesis Example 1 | precursor gel:GO = 1 g:0.05 g | 3.5 |
| Comparative Example 1 | LiOH | $MnSO_4$ | $H_3PO_4$ | $LiMnPO_4$ | XGNP-M-5 | precursor gel:graphene (GS) = 1 g:0.03 g | 3.3 |
| Comparative Example 2 | LiOH | $FeCl_2$ | $H_3PO_4$ | $LiFePO_4$ | sucrose | aqueous solution 100 mM, 2 kg:2.7 g sucrose | 7.0 |
| Comparative Example 3 | LiOH | $FeCl_2$ | $NH_4H_2PO_4$ | $LiFePO_4$ | Synthesis Example 1 | aqueous solution 6 mM, 30 ml:73 mg graphene | 6.0 |
| Comparative Example 4 | $LiCO_3$ | $FeC_2O_4$ | $NH_4H_2PO_4$ | $LiFePO_4$ | Synthesis Example 1 | precursor gel:GO = 1 g:0.05 g | 3.6 |

TABLE 2

| | Particle Diameter of Precursor Composite Granulated Bodies | Measurement of X-Ray Diffraction of Precursor Composite Granulated Bodies | Chemical Reduction Step | Heating Condition | Measurement of X-Ray Diffraction of Composite Particles | Discharge Capacity 0.1 C (mAh/g) | Discharge Capacity 3 C (mAh/g) |
|---|---|---|---|---|---|---|---|
| Example 1 | 34 nm | 5% | 1 wt % sodium dithionite 40° C. for 1 hour | 600° C. $N_2$, 12 h | 50% or more | 152 | 141 |
| Example 2 | 31 nm | 7% | 1 wt % sodium dithionite 40° C. for 1 hour | 600° C. $N_2$, 12 h | 50% or more | 159 | 149 |
| Example 3 | 28 nm | 10% | 1 wt % sodium dithionite 40° C. for 1 hour | 600° C. $N_2$, 12 h | 50% or more | 151 | 138 |
| Example 4 | 29 nm | 8% | 1 wt % sodium dithionite 40° C. for 1 hour | 600° C. $N_2$, 12 h | 50% or more | 156 | 145 |
| Example 5 | 41 nm | 6% | 1 wt % sodium dithionite 40° C. for 1 hour | 600° C. $N_2$, 12 h | 50% or more | 146 | 134 |
| Example 6 | 46 nm | 5% | 1 wt % sodium dithionite 40° C. for 1 hour | 600° C. $N_2$, 12 h | 50% or more | 141 | 113 |
| Example 7 | 48 nm | 4% | not performed | 600° C. $N_2$, 12 h | 50% or more | 146 | 122 |
| Example 8 | 45 nm | 0% | 1 wt % sodium dithionite 40° C. for 1 hour | 600° C. $N_2$, 12 h | 50% or more | 180 | (0.3 C) 132 |
| Comparative Example 1 | 120 nm | 5% | not performed | 600° C. $N_2$, 12 h | 50% or more | 77 | 44 |
| Comparative Example 2 | 150 nm | 10% | not performed | 700° C. $N_2$, 24 h | 50% or more | 76 | 25 |
| Comparative Example 3 | 450 nm | 11% | not performed | 600° C. $N_2$, 24 h | 50% or more | 84 | 34 |
| Comparative Example 4 | 80 nm | 220% | not performed | 650° C. $N_2$, 24 h | 50% or more | 103 | 32 |

The invention claimed is:

1. A method for producing polyanionic positive electrode active material composite particles, the method comprising:
   forming precursor composite granulated bodies, each of which contains a polyanionic positive electrode active material precursor particle in graphite oxide, by mixing a polyanionic positive electrode active material precursor and graphite oxide in a solid phase, wherein the amount of solvent in the solid phase mixing is 2.5 to 20% by weight relative to the weight of the polyanionic positive electrode active material precursor particle and graphite oxide; and
   heating the precursor composite granulated bodies at 500° C. or higher in an inert atmosphere or in a reducing atmosphere;
   wherein in the X-ray diffraction intensity of the precursor composite granulated bodies, the maximum intensity of the X-ray diffraction peak based on the positive electrode active material is less than 50% of the maximum intensity of the X-ray diffraction peak based on the materials other than the positive electrode active material, and
   in the X-ray diffraction intensity of the polyanionic positive electrode active material composite particles, the maximum intensity of the X-ray diffraction peak based on the positive electrode active material is 50% or more of the maximum intensity of the X-ray diffraction peak based on the materials other than the positive electrode active material, and
   wherein the solvent is water or alcohol.

2. The method for producing polyanionic positive electrode active material composite particles according to claim 1, wherein the polyanionic positive electrode active material precursor is an olivine-based positive electrode active material precursor.

3. The method for producing polyanionic positive electrode active material composite particles according to claim 1, wherein a primary particle diameter of the polyanionic positive electrode active material precursor contained in the composite granulated body is not less than 5 nm and not more than 100 nm.

4. The method for producing polyanionic positive electrode active material composite particles according to claim 1, further comprising chemically reducing the composite granulated body prior to the heating.

5. A method for producing polyanionic positive electrode active material composite particles, the method comprising:
   forming precursor composite granulated bodies, each of which contains a polyanionic positive electrode active material precursor particle in graphite oxide, by mixing a polyanionic positive electrode active material precursor and graphite oxide in a solid phase in an automatic mortar, a three roll mill, a bead mill, a planetary ball mill, a planetary mixer or a biaxial kneader, wherein the amount of solvent in the solid phase mixing is 2.5 to 20% by weight relative to the weight of the polyanionic positive electrode active material precursor particle and graphite oxide; and
   heating the precursor composite granulated bodies at 500° C. or higher in an inert atmosphere or in a reducing atmosphere;
   wherein in the X-ray diffraction intensity of the precursor composite granulated bodies, the maximum intensity of the X-ray diffraction peak based on the positive electrode active material is less than 50% of the maximum intensity of the X-ray diffraction peak based on the materials other than the positive electrode active material, and
   in the X-ray diffraction intensity of the polyanionic positive electrode active material composite particles, the maximum intensity of the X-ray diffraction peak based on the positive electrode active material is 50% or more the maximum intensity of the X-ray diffraction peak based on the materials other than the positive electrode active material.

* * * * *